(12) United States Patent
Montero Pancera et al.

(10) Patent No.: US 9,096,713 B2
(45) Date of Patent: Aug. 4, 2015

(54) METHOD FOR THE PHOSPHINE-INITIALIZED PRODUCTION OF HYPERBRANCHED POLYOLS

(75) Inventors: Sabrina Montero Pancera, Weinheim (DE); Bernhard Rieger, Garching (DE); Thomas Manfred Gunesch, Langenau (DE)

(73) Assignee: BASF SE, Ludwigshafen (DE)

( * ) Notice: Subject to any disclaimer, the term of this patent is extended or adjusted under 35 U.S.C. 154(b) by 589 days.

(21) Appl. No.: 13/380,470

(22) PCT Filed: Jun. 30, 2010

(86) PCT No.: PCT/EP2010/059253
§ 371 (c)(1),
(2), (4) Date: Dec. 22, 2011

(87) PCT Pub. No.: WO2011/000854
PCT Pub. Date: Jan. 6, 2011

(65) Prior Publication Data
US 2012/0101308 A1  Apr. 26, 2012

(30) Foreign Application Priority Data
Jun. 30, 2009  (EP) .................................... 09164094

(51) Int. Cl.
*C07C 41/02* (2006.01)
*C08G 65/22* (2006.01)
*C08G 65/10* (2006.01)

(52) U.S. Cl.
CPC ................ *C08G 65/22* (2013.01); *C08G 65/10* (2013.01)

(58) Field of Classification Search
CPC ........................... C07C 43/11; C08G 65/2639
USPC ................................................... 568/679, 680
See application file for complete search history.

(56) References Cited

U.S. PATENT DOCUMENTS

| | | | | |
|---|---|---|---|---|
| 3,636,163 A | * | 1/1972 | Jenker et al. | 568/614 |
| 6,822,068 B2 | | 11/2004 | Sunder et al. | |
| 7,985,424 B2 | * | 7/2011 | Tomalia et al. | 424/486 |
| 2004/0094741 A1 | * | 5/2004 | Sato et al. | 252/1 |
| 2006/0014851 A1 | * | 1/2006 | Loccufier et al. | 522/25 |
| 2011/0269875 A1 | | 11/2011 | Nicoleau et al. | |

FOREIGN PATENT DOCUMENTS

| | | | |
|---|---|---|---|
| DE | 19947631 A1 | 6/2000 | |
| DE | 10211664 A1 | 10/2003 | |
| EP | 1568677 A1 | 8/2005 | |
| EP | 1 616 920 A1 * | 1/2006 | ............ C09D 11/10 |
| EP | 1958929 A1 | 8/2008 | |
| GB | 477843 * | 1/1938 | |
| WO | WO-2011/064323 | 6/2011 | |

OTHER PUBLICATIONS

Brauer et al., Water-Soluble Phosphanes, Eur. J. Inorg. Chem., vol. 2000, Issue 1, Jan. 2000, pp. 65-73.*
Sunder et al. (Macromolecules 1999, vol. 32, pp. 4240-4246).*
Sunder et al. (Marcromol. Sym., 2000, vol. 153, pp. 187-196).*
U.S. Appl. No. 13/392,988, filed Feb. 28, 2011, Montero Pancera et al.

* cited by examiner

*Primary Examiner* — Rosalynd Keys
(74) *Attorney, Agent, or Firm* — Drinker Biddle & Reath LLP

(57) ABSTRACT

A process for preparing hyperbranched polyols by reacting epoxy alcohols in the presence of phosphines.

9 Claims, No Drawings

METHOD FOR THE PHOSPHINE-INITIALIZED PRODUCTION OF HYPERBRANCHED POLYOLS

CROSS-REFERENCE TO RELATED APPLICATIONS

This application is a national stage application (under 35 U.S.C. § 371) of PCT/EP2010/059253, filed Jun. 30, 2010, which claims benefit of European application 09164094.6, filed Jun. 30, 2009, the contents of each of which are incorporated herein by reference in their entireties.

FIELD OF THE INVENTION

The present invention relates to a process for preparing hyperbranched polyols (such as polyglycerols). More particularly the present invention relates to a process for preparing hyperbranched polyether polyols.

BACKGROUND

DE-A-102 11 664 and U.S. Pat. No. 6,822,068 disclose processes for preparing highly branched polyglycerols from glycidols using polyfunctional initiators having 1 to 10 000 hydroxyl, thiol and/or amino groups which must be deprotonated using suitable reagents before being used. Resultant by-products such as methanol and water must be removed by distillation prior to the actual polymerization. Thus prepared, the initiator system is then dissolved in a preferably amidated solvent, into which a solution of the monomer (glycidol), diluted with a further solvent, is metered at temperatures of 80 to 140° C.

BRIEF SUMMARY

It was an object of the present invention to remedy the disadvantages of known processes and to develop an improved process for preparing hyperbranched polyols, as for example polyether polyols.

The object according to the invention has been solved by means of a process for preparing hyperbranched polyols by reacting epoxy alcohols in the presence of phosphines.

DETAILED DESCRIPTION OF THE PREFERRED EMBODIMENTS

Suitable epoxy alcohols include 4,5-epoxy-1-pentanol, 3,4-epoxy-1-butanol, (S)-(−)-glycidol, (R)-(+)-glycidol, more preferably 2,3-epoxy-1-propanol (glycidol), (R,S)-(+/−)-2,3-epoxy-1-propanol. Additionally it is possible for 5,6-epoxy-1-hexanol, 7,8-epoxy-1-heptanol, and also analogous derivatives; 2,3-epoxy-1-methyl-1-propanol, 2,3-epoxy-1-ethyl-1-propanol, 2,3-epoxy-1-propyl-1-propanol, and also analogous derivatives; 2,3-epoxy-1-dimethyl-1-propanol, 2,3-epoxy-1-diethyl-1-propanol, 2,3-epoxy-1-dipropyl-1-propanol, and also analogous derivatives; 3,4-epoxy-1-methyl-1-butanol, 3,4-epoxy-1-ethyl-1-butanol, 3,4-epoxy-1-propyl-1-butanol, and also analogous derivatives; 3,4-epoxy-1-dimethyl-1-butanol, 3,4-epoxy-1-diethyl-1-butanol, 3,4-epoxy-1-dipropyl-1-butanol, etc.; 4,5-epoxy-1-methyl-1-pentanol, 4,5-epoxy-1-ethyl-1-pentanol, 4,5-epoxy-1-propyl-1-pentanol, and also analogous derivatives; 4,5-epoxy-1-dimethyl-1-pentanol, 4,5-epoxy-1-diethyl-1-pentanol, 4,5-epoxy-1-dipropyl-1-pentanol, and also analogous derivatives, to be used as epoxy alcohol. Additionally possible is the use of further epoxy alcohols with a structure resulting, for example, from varying the chemical radicals between the epoxy ring and the hydroxyl group.

Mixtures of different epoxy alcohols can be polymerized. In general, however, only epoxy alcohols of one type are used.

Especially suitable for the process of the invention are the phosphines which are liquid at the reaction temperature and are homogeneously miscible with the epoxy alcohols.

Solid phosphines are especially suitable when they are soluble in the epoxy alcohols. Furthermore, gaseous phosphines are suitable. Suitable phosphines include monoalkyl-, and monoarylphosphines, dialkyl- and diarylphosphines, and trialkyl- and triarylphosphines. Arylphosphines are suitable with preference. Suitability is possessed, for example, by phosphine ($PH_3$), methylphosphine, ethylphosphine, and the corresponding analogs; phenylphosphine; o-tolylphosphine, 1-naphthylphosphine; dimethylphosphine, diethylphosphine, and the corresponding analogs; diphenylphosphine; di(o-tolyl)phosphine, di-1-naphthylphosphine; trimethylphosphine, triethylphosphine, and the corresponding analogs; triphenylphosphine; tri(o-tolyl)phosphine, tri-1-naphthylphosphine. It is possible to use a mixture of two or more phosphines. In general, however, only one type of phosphines is used. With particular preference diphenylphosphine is used.

With regard to the mixing of the reaction components, phosphines can be added to epoxy alcohols or, preferably, epoxy alcohols can be added to phosphines.

The metered introduction may take place all at once or, in the case of the preferred sequence of metered introduction, discontinuously, in stages (stepwise) or, preferably, continuously.

Depending on the starting materials or desired reaction rate, it is possible to carry out the process of the invention at relatively low or relatively high temperatures. The reaction can be carried out at a temperature of 0 to 200° C., preferably at 4 to 50° C., more preferably at 15 to 30° C., more particularly at room temperature. For example, the reaction can be carried out at temperatures of 0 to 70° C.

The reaction can be carried out at pressures of 0.01 to 50 bar, preferably of 0.1 to 5 bar, more particularly standard pressure (atmospheric pressure).

The molar ratio of epoxy alcohol to phosphine can be varied within wide limits and is preferably from 5000:1 to 10:1, more preferably from 500:1 to 30:1, more particularly from 300:1 to 50:1. In general a minimal amount of phosphine is used, selected such that the reaction rate is sufficient and the degree of reaction is virtually complete or complete.

The reaction can be carried out in the presence of a solvent. Where the phosphines used are not miscible with the epoxy alcohol used at the reaction temperature, it is preferred to use at least one solvent. Particularly in the case of low temperatures it is possible in the process of the invention to do without a solvent as heat absorber. At higher temperatures, particularly in the case of exothermic polymerizations, at least one solvent may be used for reaction control. The amount of solvent can be varied within wide limits and the weight ratio is generally from 0.1:1 to 1000:1, preferably from 1:1 to 100:1, in particular from 5:1 to 50:1, based on epoxy alcohol. The reaction is carried out preferably substantially in the absence of a solvent, i.e. from 0.09:1 to 0.0001:1, preferably from 0.05:1 to 0.001:1, based on the epoxy alcohol. With particular preference the reaction is carried out in the absence of a solvent. For the purposes of this invention, the epoxy alcohols and the phosphines are not solvents.

Suitable solvents are those solvents in which phosphines and/or epoxy alcohols are soluble. Especially suitable as solvents are amides, such as dimethylformamide, for example, but also cyclic ethers, such as tetrahydrofuran and/or aliphatic ethers, such as diglyme, for example.

The reaction can be carried out preferably under an inert gas atmosphere. Suitable inert gases are all those gases which are so slow to react that they do not react with the reaction mixture. Suitable examples include nitrogen, helium and/or argon.

The reaction times may vary within wide limits. The may range within the region of minutes, or may extend over days. They may be, for example, from 0.5 to 500 h or from 1 to 200 h. The polymerization is generally at an end as soon as the monomer, the epoxy alcohol, has been consumed.

The hyperbranched polyol obtained by the process of the invention may either be used further directly or purified prior to use. The polyols can be neutralized during, or, preferably, after the end of polymerization, by dissolution in a suitable solvent, such as methanol and/or by filtration over ion exchangers, preferably only dissolution in a suitable solvent, and can be purified subsequently by precipitation with, for example, acetone (Sunder, A.; Hanselmann, R.; Frey, H.; Müllhaupt, R. Macromolecules 1999, 32, 4240). The resulting product can be dried under reduced pressure, for example at temperatures of 0 to 150° C., preferably at 30 to 80° C.

The hyperbranched polyols prepared by means of the process of the invention are, for example, polyether polyols. Their ether bridge may be aromatic and/or aliphatic, depending on the epoxy alcohol used as starting material. Depending on whether a mixture of different epoxy alcohols is used or not, the ether bridges in the molecule may be different in nature, substantially identical, or identical. The hyperbranched polyols preferably comprise ether bridges of one type. The ether bridges are preferably aliphatic. More particularly they comprise three carbon atoms. The process of the invention is used preferably to prepare polyols which have structures of the kind shown in FIG. 1.

FIG. 1: Polyether polyol structure.

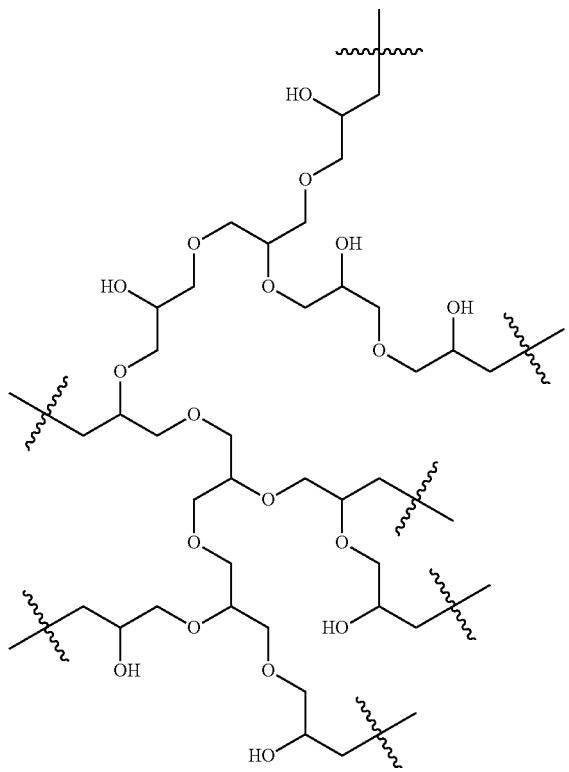

The hyperbranched polyols can be analyzed for their average molar mass weight. The measurements of the molar mass weight ($M_w$) may be carried out by means of MALDI-TOF-MS analysis. The resulting polymer, the hyperbranched polyol, for example polyether polyol, generally has an average molar mass weight of up to 1500 g/mol, i.e. 200 to 1500 g/mol, preferably 400 to 1400 g/mol, more preferably 500 to 1200 g/mol.

The polyol may also be characterized via its molar mass distribution (polydispersity=PDI). The measure of the polydispersity is characterized by the formula below—that is, the polydispersity is the ratio of the weight-average molar mass to the number-average molar mass, and may be equal to or greater than the number 1.

Formula 1: Formula for calculating the polydispersity.

$$PDI = \frac{M_w}{M_n} \geq 1$$

$M_w$=weight-average molar mass (also referred to as average molar mass weight)
$M_n$=number-average molar mass The weight-average molar mass (Mw) and the number-average molar mass (Mn) can be determined by means of gel permeation chromatography (GPC).

The polyols obtained by the process of the invention generally have a molar mass distribution (polydispersity=PDI) of less than 2.5, preferably less than 2, more preferably less than 1.7, more particularly less than 1.4, and greater than or equal to 1, preferably greater than 1, more preferably greater than 1.1, more particularly greater than 1.15.

The polyols obtainable by the process of the invention are hyperbranched, which means that they have a high proportion of branching points. They have a high to very high degree of branching (DB). The degree of branching DB is situated generally at values of 10% to 99%, preferably of 25% to 90%, and more preferably of 30% to 80%. The term "hyperbranched" in the context of the present invention is used synonymously with "highly branched". Hyperbranched polymers are to be distinguished from dendrimers. With regard to the definition of the degree of branching (DB), see H. Frey et al., Acta Polym. 1997, 48, 30. With regard to the definition of the term "hyperbranched", see Sunder et al., Chem. Eur. J. 2000, 6 (14), 2499-2506. The degree of branching can be calculated using "inverse gated" $^{13}$NMR spectra. The degree of branching is generally 10% to 66%, preferably 20% to 55%, more preferably 20% to 50%, more particularly 25% to 40%.

Titration of the polyols prepared by the process of the invention allows the number of terminal hydroxyl groups to be ascertained (Carey, M.; Wellons, S.; Elder, D. Journal of Cellular Plastics 1984, 20, 42). The number of terminal hydroxyl groups is preferably in the range from 5 to 20 mmol, more preferably from 5 to 15 mmol, very preferably from 10 to 15 mmol, per gram of polyol.

The inventively preparable polyols are suitable for use in the chemical and pharmaceutical industries, for example as polymeric support materials for catalysts and active compounds, as a coating for drugs or vitamins, or as protein mimetics in the biomineralization of $CaCO_3$ (J. Mater. Chem., 2008, Vol. 18, page 2789 to 2797), as additives for coatings and adhesives.

The process of the invention also allows a reaction regime without the use of solvents. This results in increased profitability, since there is no need for solvents to be separated off and worked up after the reaction regime. The omission of toxic and/or combustible solvents is advantageous from the standpoint of safety, furthermore.

EXAMPLES

Example 1

0.43 g (0.4 ml; 2.31 mmol) of diphenylphosphine was mixed under an inert gas atmosphere (argon) with 22.29 g (20 ml; 300.89 mmol) of freshly distilled glycidol and the mixture was left to react at 25° C. for 96 h with continual magnetic stirring.

After the end of the reaction, the polymer was dissolved in 40 ml of methanol and then precipitated from 400 ml of acetone. The precipitated polymer was separated from the supernatant solvent by decanting. This procedure was performed a total of two times.

The supernatant solution was decanted and the product obtained was dried under reduced pressure at 60° C. This gave 13 g (58%) of a yellowish resin of high viscosity having an average molecular weight of approximately 1000 g/mol (determined according to $M_w$=970 (GPC) or 1015 (MALDI)) and a polydispersity of 1.4 (determined according to PDI=$M_w/M_n$).

Example 2

Example 1 was repeated in order to demonstrate the reproducibility. 0.43 g (0.4 ml; 2.31 mmol) of diphenylphosphine was mixed under an inert gas atmosphere (argon) with 22.29 g (20 ml; 300.89 mmol) of freshly distilled glycidol and the mixture was subjected to constant magnetic stirring at 25° C. for 96 h.

After the end of the reaction, the polymer was dissolved in 40 ml of methanol and then precipitated from 400 ml of acetone. The precipitated polymer was separated from the supernatant solvent by decanting. This procedure was performed a total of two times.

The supernatant solution was decanted and the product obtained was dried under reduced pressure at 60° C. This gave 13 g (58%) of a yellowish resin of high viscosity having an average molecular weight of $M_n$=790 g/mol (GPC) or 760 g/mol (MALDI) and a polydispersity of 1.47 (GPC measurement).

Example 3

0.22 g (0.2 ml; 1.16 mmol) of diphenylphosphine was mixed under an inert gas atmosphere (argon) with 11.15 g (10 ml; 150.45 mmol) of freshly distilled glycidol and the mixture was stirred continuously at 4° C. for 3 weeks.

After the end of the reaction, the polymer was dissolved in methanol and then precipitated from acetone, The precipitated polymer was separated from the supernatant solvent. This procedure was performed a total of two times.

The product obtained was dried under reduced pressure at 60° C. This gave 6 g (54%) of a colorless resin of high viscosity having an average molecular weight of $M_n$=826 g/mol (GPC) and a polydispersity of 1.49 (GPC measurement).

Example 4

0.11 g (0.1 ml; 0.58 mmol) of diphenylphosphine was mixed under an inert gas atmosphere (argon) with 22.29 g (20 ml; 300.89 mmol) of freshly distilled glycidol and the mixture was stirred continuously at 40° C. for 96 h.

After the end of the reaction, the polymer was dissolved in methanol and then precipitated from acetone. The precipitated polymer was separated from the supernatant solvent. This procedure was performed a total of two times.

The product obtained was dried under reduced pressure at 60° C. This gave 11 g (49%) of a yellowish resin of high viscosity having an average molecular weight of $M_n$=595 g/mol (GPC) and a polydispersity of 1.50 (GPC measurement).

Example 5

0.22 g (0.2 ml; 1.16 mmol) of diphenylphosphine was mixed under an inert gas atmosphere (argon) with 5.58 g (5 ml; 75.23 mmol) of freshly distilled glycidol and the mixture was stirred continuously at 75° C. for 1 h.

After the end of the reaction, the product was in the form of a dark brown resin of high viscosity.

Example for Measuring the Molar Mass Weight

The measurements were recorded on a Bruker Biflex III MALDI-TOF mass spectrometer equipped with a nitrogen laser supplying 3 ns laser pulses at 337 nm.

The matrix used was dithranol. The samples were prepared by dissolving the polymer in methanol at concentrations of 1 g/l. Using these samples, together with the matrix, a 1:1 mixture was prepared. A portion of this solution was subjected to measurement following evaporation of the methanol and the formation of a thin matrix/analyte film.

The ions were accelerated to 21.50 kV and measured in reflectron mode.

Example for Carrying Out the Gel Permeation Chromatography (GPC)

For the conduct of the gel permeation chromatography measurements, the polyols, polyether polyols for example, were dissolved in demineralized water at concentrations of 5 g/l. Subsequently the dissolved polyols, polyether polyols for example, were analyzed with water as eluent at room temperature on PSS Suprema columns. The calibration standards used were defined polyethylene glycols having molecular weights between 200-500 000 g/mol and very low polydispersities (~1.05). The standards used are available commercially from Sigma Aldrich under the name "Poly(ethylene glycol) standard, for GPC", for example. Detection was carried out using a refractive index detector (RI detector).

Example for Determining the Degree of Branching (DB)

For this purpose, $^1$H NMR and $^{13}$C NMR spectra in $d_4$-methanol or $D_2O$ at concentrations of 100 g/l were subjected to measurement on a Bruker ARX 300 spectrometer at 300.13 for example 75.4 MHz.

At the evaluation stage it is necessary to bear in mind that linear units (L) are formed during the polymerization if only one of the two possible propagation sites of the AB2 monomer undergoes further reaction. In the case of glycidol, the two chain propagation sites are nonequivalent, moreover, meaning that it is also necessary to distinguish between propagation at the primary (L2) alcohol group and at the secondary (L1) alcohol group. Conversely, where both the primary and the secondary alcohol and/or alkoxide group of the same glycidol molecule undergo further reaction, branching sites are produced, or dendritic units (D). Lastly, if neither of the alcohol and/or alkoxide functions contributes to chain propagation, a terminal unit (T) is produced.

For determining the degree of branching, the spectra obtained were evaluated as described below. In the "inverse gated" $^{13}$C NMR spectra measured, seven signals between 60 and 85 ppm were detectable, and were assigned to the individual carbon atoms of the structural units depicted, as follows: the linear units, formed by propagation of the secondary alkoxide ($L_1$), were allocated the signals at 62.8 ppm ($CH_2OH$), 71.2 ppm ($CH_2$) and 81.5 ppm (CH).

The linear units, formed by propagation of the primary alkoxide ($L_2$), are distinguished by signals at 70.9 ppm (CHOH) and 74.1 ppm (both $CH_2$). The terminal units (T) were allocated the signals at 64.6 ppm ($CH_2OH$) and two of the signals in the region between 72.2-73.1 ppm ($CH_2$ and CHOH). Located in the same region as well were two signals ($CH_2$) of the dendritic units (D), which overlap with the latter signals. The last signal of this structural unit is found at 79.9 ppm (CH).

Measuring the $^{13}$C NMR spectra in inverse-gated mode makes it possible, on account of the possibility for integration of the signals, to draw further conclusions concerning the relative frequency of the individual structural units in the polymer.

The results of the integration are summarized in the table below:

TABLE 1

| Relative frequency of the structural units in hyperbranched polyglycerol | | | | | | |
|---|---|---|---|---|---|---|
| Unit | $L_1$ | D | $2L_2$ | 2D, 2T | $L_1, L_2$ | T | $L_1$ |
| ppm | 81.4-81.6 | 79.6-80.3 | 73.9-74.5 | 72.2-73.1 | 70.7-71.4 | 64.5-64.8 | 62.5-62.9 |
| Integral | 1.00 | 2.17 | 18.00 | 14.11 | 9.28 | 4.40 | 1.00 |

| | Linear ($L_1$) | Linear ($L_2$) | Terminal | Dendritic |
|---|---|---|---|---|
| Relative frequency (%) | 6 | 53 | 26 | 15 |

On the basis of the $L_2$ value, which is the highest at 53%, Table 1 suggests that the polymer grows largely via propagation on the primary alkoxide function. The relative frequencies of the individual structural units, which are listed in Table 1, can be used to draw conclusions concerning the degree of branching of the polymers. The degree of branching, by definition, adopts a value of 0 for linear polymers and a value of 1 for perfectly branched dendrimers. The degree of branching for hyperbranched polymers is situated between these values, and under specific conditions, such as very slow monomer addition, for example, in the case of polymerizations of $AB_2$ monomers, is able to reach a maximum level of 0.66 or 66% (Radke. W.; Litvinenko, G.; Muller, A. H. E. Macromolecules 1998, 31, 239.)

Arithmetically, the degree of branching may be determined on the basis of the integrals of the individual structural units, as a ratio of the dendritic units to the sum of linear and dendritic units, in accordance with the formula below (Höter, D.; Burgath, A.; Frey, H. Acta Polym. 1997, 48, 30.)

Formula 2: Calculation of the degree of branching.

$$DB = \frac{2D}{2D + L}$$

DB=degree of branching
D=relative frequency of dendritic units
L=relative frequencies of $L_1$ and $L_2$ units
Inserting the values from Table 1 allows a degree of branching of 34% to be calculated.

The invention claimed is:

1. A process for preparing hyperbranched polyols comprising reacting epoxy alcohols in the presence of phosphines, wherein the polyols are polyether polyols.

2. The process according to claim 1, wherein the reacting is carried out at a temperature of 0 to 200° C.

3. The process according to claim 1, wherein the reacting is carried out at a pressure of 0.01 to 50 bar.

4. The process according to claim 1, wherein the reacting is carried out in the presence of a solvent.

5. The process according to claim 1, wherein the reacting is carried out substantially in the absence of a solvent.

6. The process according to claim 1, wherein highly branched and/or hyperbranched polyols having an average molar mass weight (Mw) of up to 1500 g/mol are produced.

7. The process according to claim 1, wherein highly branched and/or hyperbranched polyols having a molar mass distribution of less than 2.5 are produced.

8. The process according to claim 1, wherein the epoxy alcohol is 2,3-epoxy-1-propanol (glycidol).

9. The process according to claim 1, wherein the phosphine is diphenylphosphine.

* * * * *